United States Patent
Li et al.

(10) Patent No.: US 7,626,675 B2
(45) Date of Patent: Dec. 1, 2009

(54) COLOR FILTER SUBSTRATE AND LIQUID CRYSTAL DISPLAY PANEL WITH SPACER HAVING A RECESS OR CLIPPING OPENING IN WHICH AN ACTIVE DEVICE IS WEDGED THEREIN

(75) Inventors: De-Jiun Li, Taipei County (TW); Der-Chun Wu, Taipei County (TW)

(73) Assignee: Chungwa Picture Tubes, Ltd., Taoyuan (TW)

( * ) Notice: Subject to any disclaimer, the term of this patent is extended or adjusted under 35 U.S.C. 154(b) by 594 days.

(21) Appl. No.: 11/308,669

(22) Filed: Apr. 20, 2006

(65) Prior Publication Data

US 2007/0247584 A1    Oct. 25, 2007

(51) Int. Cl.
    G02F 1/1339    (2006.01)
(52) U.S. Cl. .................. 349/156; 349/155; 349/157
(58) Field of Classification Search .......... 349/106, 349/155–157
    See application file for complete search history.

(56) References Cited

U.S. PATENT DOCUMENTS 7,345,732 B2 * 3/2008 Liu et al. ............. 349/156
2005/0146669 A1 * 7/2005 Yeh et al. ............. 349/141
2005/0179853 A1 * 8/2005 Chen et al. ............. 349/155
2007/0070285 A1 * 3/2007 Liu et al. ............. 349/156

FOREIGN PATENT DOCUMENTS

| CN | 2862107      | 1/2007  |
|----|--------------|---------|
| JP | 09-073088    | 3/1997  |
| JP | 2000-330121  | 11/2000 |
| JP | 2003-098531  | 4/2003  |
| JP | 2004-205549  | 7/2004  |
| JP | 2004-302465  | 10/2004 |

* cited by examiner

Primary Examiner—John Heyman
(74) Attorney, Agent, or Firm—Jianq Chyun IP Office (57) ABSTRACT

A color filter substrate adapted for being assembled with an active device array substrate is provided. The active device array substrate includes active devices, scan lines and data lines. Protrusions are formed at the regions where the scan lines overlap with the data lines. The color filter substrate includes a substrate, a light shielding layer, a color filter layer, a conductive layer and spacers. The spacers are disposed on the substrate, and each spacer has a clipping opening therein, and at least one of the active devices and protrusions is wedged in the corresponding clipping opening. Therefore, the precision of panel assembling is increased.

25 Claims, 6 Drawing Sheets

COLOR FILTER SUBSTRATE AND LIQUID CRYSTAL DISPLAY PANEL WITH SPACER HAVING A RECESS OR CLIPPING OPENING IN WHICH AN ACTIVE DEVICE IS WEDGED THEREIN

BACKGROUND OF THE INVENTION

1. Field of the Invention

The present invention generally relates to a color filter substrate (CF substrate) and a liquid crystal display panel (LCD panel), in particular, to a color filter substrate and a liquid crystal display panel, which are able to improve the precision of panel assembly and bear the lateral stress.

2. Description of Related Art

With recent advancement in opto-electronic and semiconductor technology, the technology for fabricating flat displays becomes more mature. For display devices, the liquid crystal display device having advantages of higher image quality, optimal space efficiency, low power and non-radiation has become the main stream on the market. Generally speaking, the liquid crystal display device comprises a liquid crystal display panel and a backlight module. More specifically, the liquid crystal display panel is composed of a color filter substrate, an active device array substrate and a liquid crystal layer.

The characteristics of the liquid crystal display device, such as response time, brightness, contrast and viewing angle, are related to the thickness of the liquid crystal layer. Therefore, the thickness of the liquid crystal layer should be controlled precisely according to optical properties of liquid crystals. Generally, spacers are disposed between the color filter substrate and the active device array substrate to form a gap between the two substrates. Spacers can be divided into ball-shape spacers and photo-spacers. Photo-spacers fabricated by photolithography process can maintain the gap more even, and therefore ball-shape spacers are gradually replaced by photo-spacers.

Figure 1:
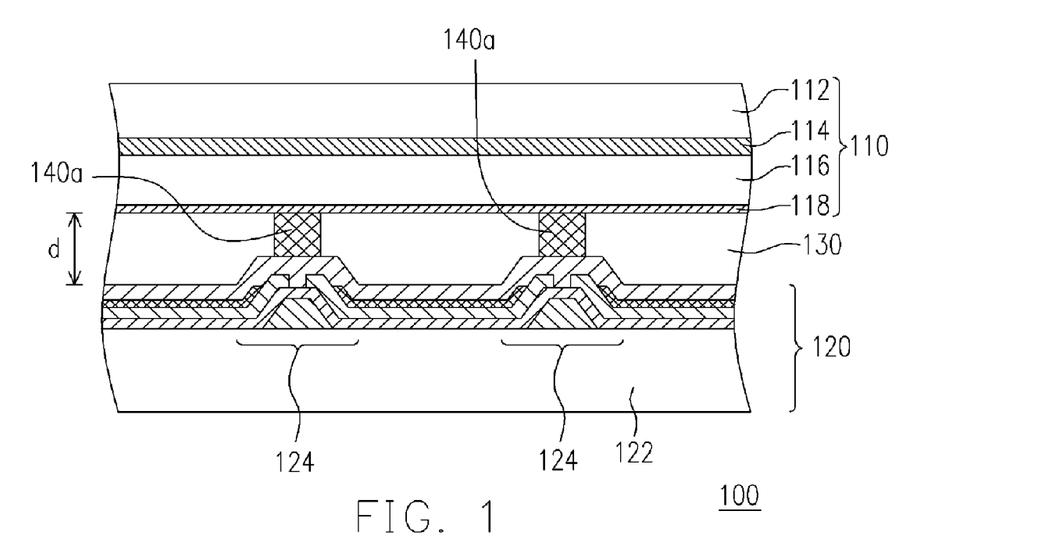
FIG. 1 is a schematic cross-sectional view showing a conventional liquid crystal display panel.

FIG. 1 is a schematic cross-sectional view showing a conventional liquid crystal display panel. The liquid crystal display panel 100 comprises a color filter substrate 110, an active device array substrate 120 and a liquid crystal layer 130. The color filter substrate 110 comprises a substrate 112, a light shielding layer 114, a color filter layer 116 and a common electrode 118. The active device array substrate 120 comprises a substrate 122, a plurality of thin film transistors 124, scan lines and data lines (not shown). Particularly, the liquid crystal display panel 100 utilizes the photo-spacers 140a to maintain the gap d between the color filter substrate 110 and the active device array substrate 120, such that the liquid crystal layer 130 is sandwiched between the color filter substrate 110 and the active device array substrate 120.

To follow the trend of higher finger pressing stress applied to the liquid crystal display panel 100, the number of the photo-spacers 140a per unit area should be increased. When the user wipes the liquid crystal display panel 100, the photo-spacers 140a are displaced by lateral stress, and therefore displacement occurs between the color filter substrate 110 and the active device array substrate 120. And this would result in light leakage or the center of the liquid crystal display panel 100 would become darker.

Figure 2:
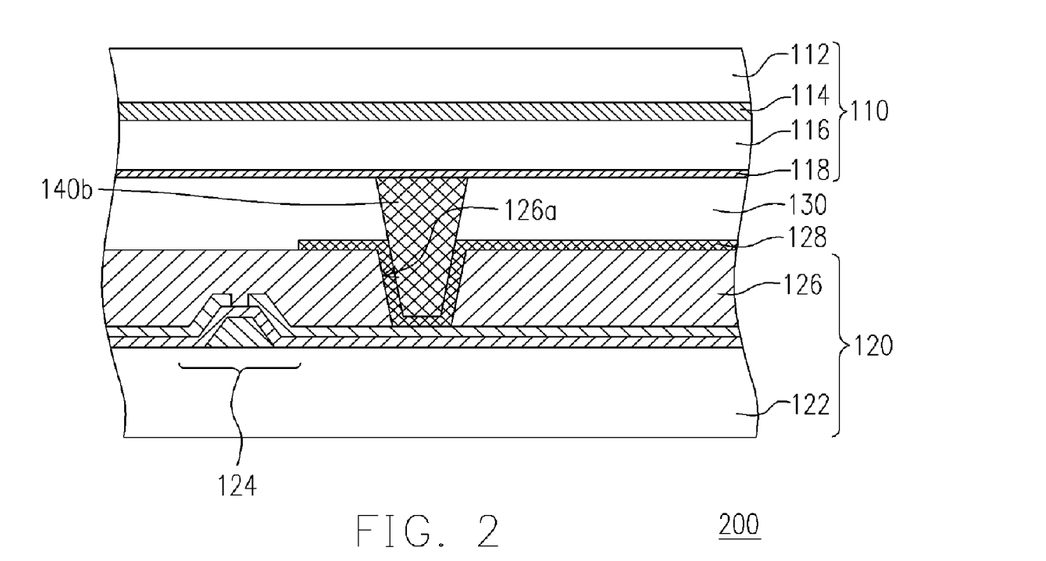
FIG. 2 is a schematic cross-sectional view showing other conventional liquid crystal display panel.

As shown in FIG. 2, other photo-spacers 140b are provided to resolve the above-mentioned problems. The same reference numbers are used in FIG. 2 to refer to the same or like parts. In the liquid crystal display panel 200, a planarization layer 126 covers the active device array substrate 120, and a contact opening 126a is formed in the planarization layer 126 to make the pixel electrode 128 electrically connect to the thin film transistor 124. Note that the photo-spacer 140b is disposed in the contact opening 126a, and therefore compared to the liquid crystal display 100 shown in FIG. 1, the liquid crystal display panel 200 can bear larger lateral stress.

Because the dimension of the contact openings 126a is smaller, the precision of the liquid crystal display panel 200 assembly would be lower. As a result, when the user wipes the liquid crystal display panel 200, the photo-spacers 140b would still be displaced if the lateral stress is larger. And the problem of displacement between the two substrates, light leakage and so on would still occur.

SUMMARY OF THE INVENTION

Accordingly, the present invention is directed to a color filter substrate suitable for improving the precision when it is assembled with an active device array substrate. Further, the problem of displacement between the two substrate and light leakage when wiping the liquid crystal display panel can be prevented.

The present invention is also directed to a liquid crystal display panel. The liquid crystal display panel utilizes the above-mentioned color filter substrate to prevent the problems of displacement between the two substrate and light leakage.

As embodied and broadly described herein, the present invention provides a color filter substrate suitable for being assembled with an active device array substrate. The active device array substrate comprises a plurality of active devices, a plurality of scan lines and a plurality of data lines, a plurality of protrusions formed at the regions where the scan lines overlap with the data lines. The color filter substrate comprises a substrate, a light shielding layer, a color filter layer, a conductive layer and a plurality of spacers. The light shielding layer is disposed on the substrate to define a plurality of sub-pixel regions. The color filter layer is disposed within the sub-pixel regions on the substrate and covers the light shielding layer. The conductive layer is disposed on the substrate and covers the color filter layer and the light shielding layer. The spacers are disposed on the substrate, and each spacer has a clipping opening therein, and at least one of the active devices and the protrusions is wedged in the corresponding clipping opening.

As embodied and broadly described herein, the present invention also provides a liquid crystal display panel comprising a color filter substrate, an active device array substrate and a liquid crystal layer. The color filter substrate is the above-mentioned color filter substrate for example. The active device array substrate comprises a plurality of active devices, a plurality of scan lines and a plurality of data lines, and a plurality of protrusions formed at the regions where the scan lines overlap with the data line. The liquid crystal layer is disposed between the color filter substrate and the active device array substrate. At least one of the active devices and the protrusions is wedged in the corresponding clipping opening.

According to an embodiment of the present invention, the light shielding layer is a black matrix.

According to an embodiment of the present invention, the spacers are photo-spacers.

According to an embodiment of the present invention, the color filter substrate further comprises a first groove disposed in the color filter layer corresponding to each spacer, and each spacer is partially disposed within the first groove.

According to an embodiment of the present invention, the color filter substrate further comprises a second groove disposed in the light shielding layer corresponding to each spacer, and each spacer is partially disposed within the first groove and the second groove.

According to an embodiment of the present invention, the width of the upper part of the clipping opening is wider than that of the active devices and the protrusions for about 2~3 μm.

According to an embodiment of the present invention, the height of each spacer is between 0.2~5.0 μm.

According to an embodiment of the present invention, the height of the active device is between 0.3~0.6 μm.

According to an embodiment of the present invention, the height of the protrusion is between 0.3~0.6 μm.

According to an embodiment of the present invention, the material of the spacers comprises photoresist.

According to an embodiment of the present invention, the active devices comprise thin film transistors.

According to an embodiment of the present invention, the material of the conductive layer can be one of indium tin oxide and indium zinc oxide.

The present invention utilizes the spacers having the clipping opening to improve the assembly precision of the color filter substrate and the active device array substrate. Besides, the liquid crystal display panel can bear larger lateral stress by forming the spacers in the color filter layer and/or the light shielding layer, and the problem of displacement between the two substrate and light leakage when wiping the liquid crystal display panel can be prevented.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
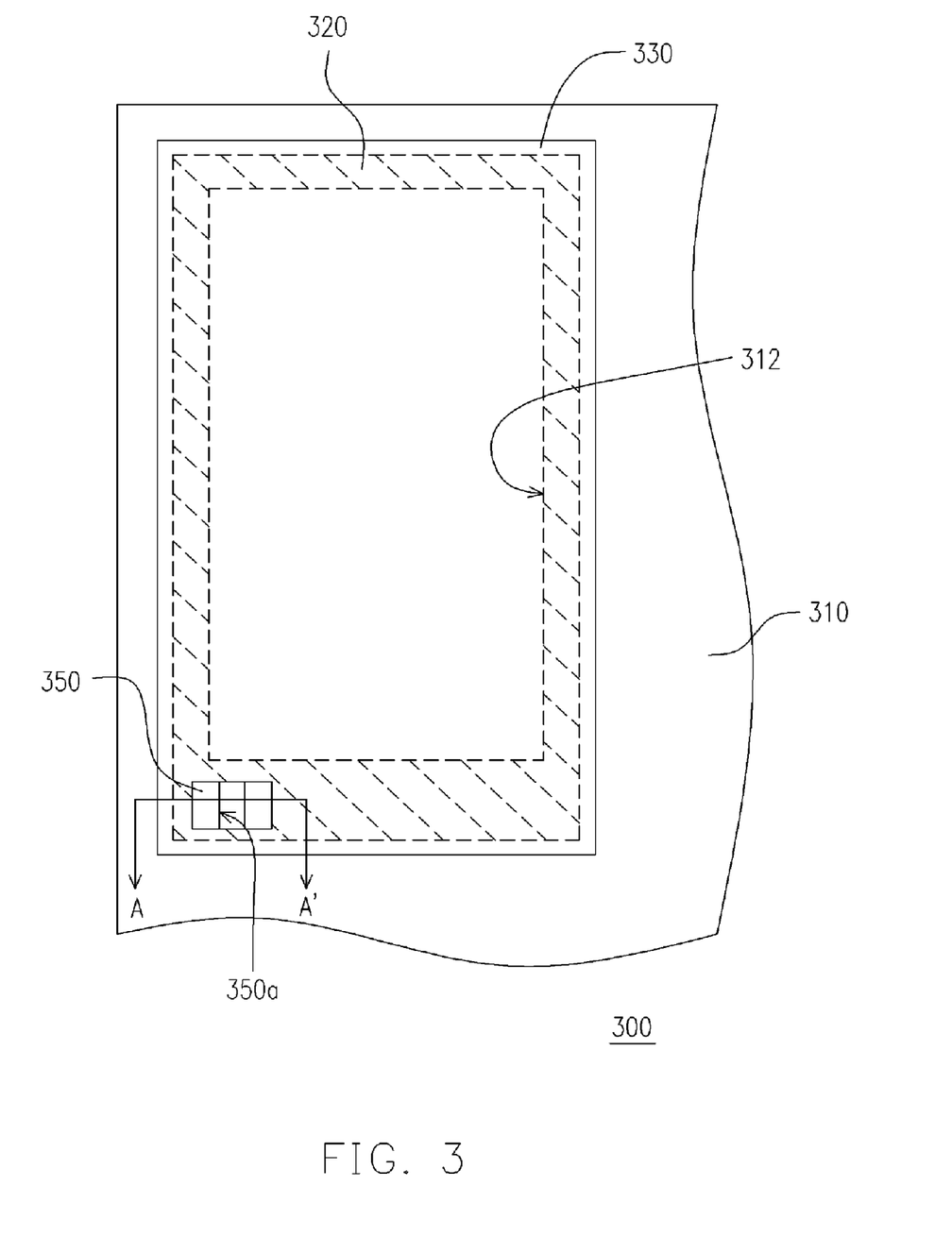
FIG. 3 is a vertical view showing a color filter substrate according to a preferred embodiment of the present invention.
Figure 3A:
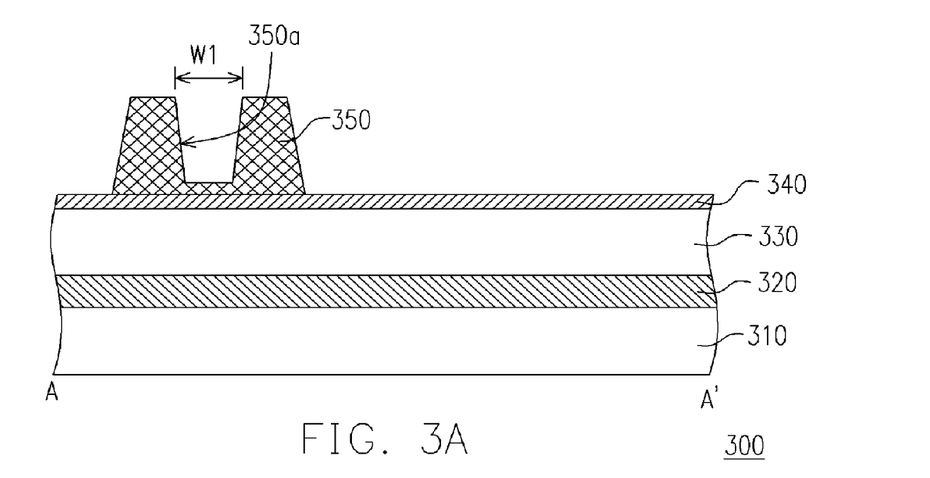
FIG. 3A is a schematic cross-sectional view along line A-A' of FIG. 3.

FIG. 3 is a vertical view showing a color filter substrate according to a preferred embodiment of the present invention. FIG. 3A is a schematic cross-sectional view along line A-A' of FIG. 3. Please refer to FIGS. 3 and 3A, a color filter substrate 300 is suitable for being assembled with an active device array substrate 400 (shown in FIG. 4). The active device array substrate 400 comprises a plurality of active devices 410, a plurality of scan lines 420 and a plurality of data lines 430; a plurality of protrusions 440 are formed at the regions where the scan lines 420 overlap with the data lines 430. Besides, the active devices 410 are electrically connected to pixel electrodes 450.

Please refer to FIGS. 3 and 3A, the color filter substrate 300 comprises a substrate 310, a light shielding layer 320, a color filter layer 330, a conductive layer 340 and a plurality of spacers 350. The light shielding layer 320 is disposed on the substrate 310 to define a plurality of sub-pixel regions 312. The color filter layer 330 is disposed within the sub-pixel regions 312 on the substrate 310 and covers the light shielding layer 320. The conductive layer 340 is disposed on the substrate 310 and covers the color filter layer 330 and the light shielding layer 320. The spacers 350 are disposed on the substrate 310, and each spacer 350 has a clipping opening 350a therein, and at least one of the active devices 410 and the protrusions 440 is wedged in the corresponding clipping opening 350a (as shown in FIGS. 4A and 4B).

Please continue to refer to FIGS. 3 and 3A, in one embodiment of the present invention, the light shielding layer can be a black matrix 320. The light shielding layer 320 can be fabricated by photolithography process if the light shielding layer 320 is composed of a light-shielding resin. Besides, the light shielding layer 320 can be fabricated by photolithography and etching processes if the light shielding layer 320 is composed of chromium.

The material of the color filter layer 330 can be photoresist (PR). The color filter layer 330 comprises red photoresist blocks, green photoresist blocks and blue photoresist blocks; one of the red photoresist block, green photoresist block and blue photoresist block is disposed within the sub-pixel region 312. The arrangement of the red photoresist blocks, green photoresist blocks and blue photoresist blocks can be Mosaic type, stripe type, four pixels type, triangle type and so on.

The material of the conductive layer 340 can be indium tin oxide or indium zinc oxide. The conductive layer 340 can be formed by sputtering for example. The conductive layer 340 described here serves as a common electrode. It should be noted that in one embodiment of the present invention, the spacers 350 can be photo-spacers. Besides, the material of the spacers 350 can be photoresist, and they can be fabricated by photolithography process for example. In one embodiment of the present invention, the height of each spacer 350 is between 0.2~5.0 μm; the height of the active device 410 is between 0.3~0.6 μm; the height of the protrusion 440 is between 0.3~0.6 μm.

Besides, the width w1 of the upper part of the clipping opening 350a is wider than the width w2 of the active devices 410 and the protrusions 440 for about 2~3 μm (shown in FIG. 4A), to make the alignment and assembly of the color filter substrate 300 and the active device array substrate 400 more easily.

Further, the spacers 350 can be embedded in the color filter layer 330 and/or the light shielding layer 320, such that the liquid crystal display panel can bear larger lateral stress.

Figure 3B:
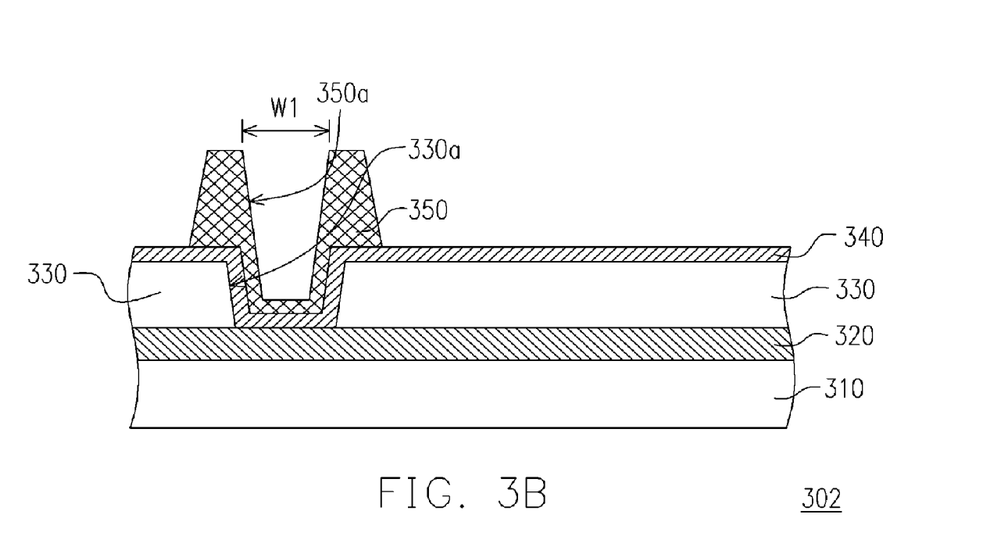
FIGS. 3B and 3C are schematic cross-sectional view showing other color filter substrates according to the preferred embodiments of the present invention.
Figure 3C:
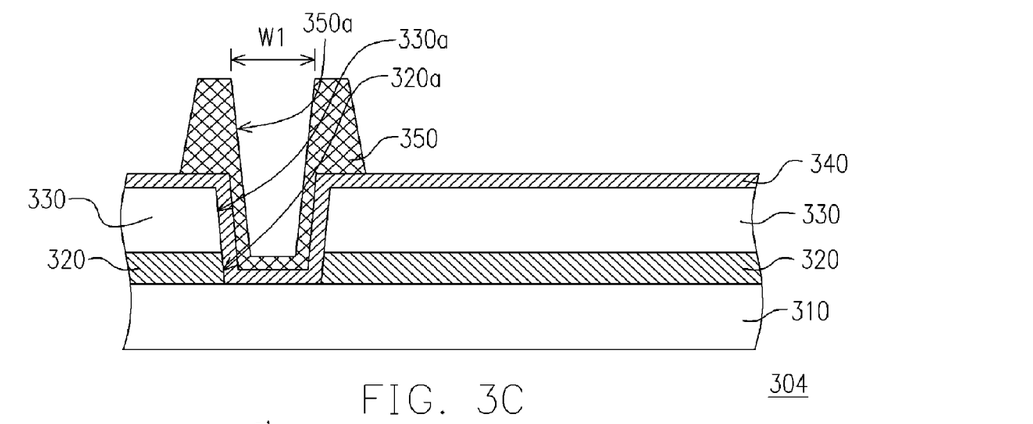

FIGS. 3B and 3C are schematic cross-sectional view showing other color filter substrates according to the preferred embodiments of the present invention. The same reference numbers are used in FIGS. 3A and 3B to refer to the same or like parts as shown in FIG. 3A. Please refer to FIG. 3B, the color filter substrate 302 further comprises a first groove 330a disposed therein and corresponding to each spacer 350, and each spacer 350 is partially disposed within the first groove 330a. Besides, please refer to FIG. 3C, the color filter substrate 304 further comprises a second groove 320a disposed in the light shielding layer 320 and corresponding to each spacer 350, and each spacer 350 is partially disposed within the first groove 330a and the second groove 320a. The spacer 350 can bear larger lateral stress by this design, and the problem of displacement between the two substrate and light leakage when wiping the liquid crystal display panel can be prevented.

In summary, the color filter substrate 300 of the present invention utilizes the spacers 350 having the clipping opening 350a to clip the active device 410 protruded on the surface of the active device array substrate 400 or the protrusions 440 formed at the regions where the scan lines 420 overlap with the data line 430. The active devices 410 and/or protrusions 440 can be wedged in the clipping opening 350a easily, to improve the assembly precision of the panel. Besides, a part of the spacers 350 are disposed within the first groove 330a of the color filter layer 330 and/or the second groove 320a of the light shielding layer 320, such that the spacers 350 can bear larger lateral stress and would not be displaced easily. Further, the problem of displacement between the two substrate and light leakage when wiping the liquid crystal display panel can be prevented.

A liquid crystal display panel illustrated in the following can be fabricated by using the above-mentioned color filter substrate 300, to prevent the problem of displacement between the two substrate and light leakage when wiping the liquid crystal display panel.

Figure 4:
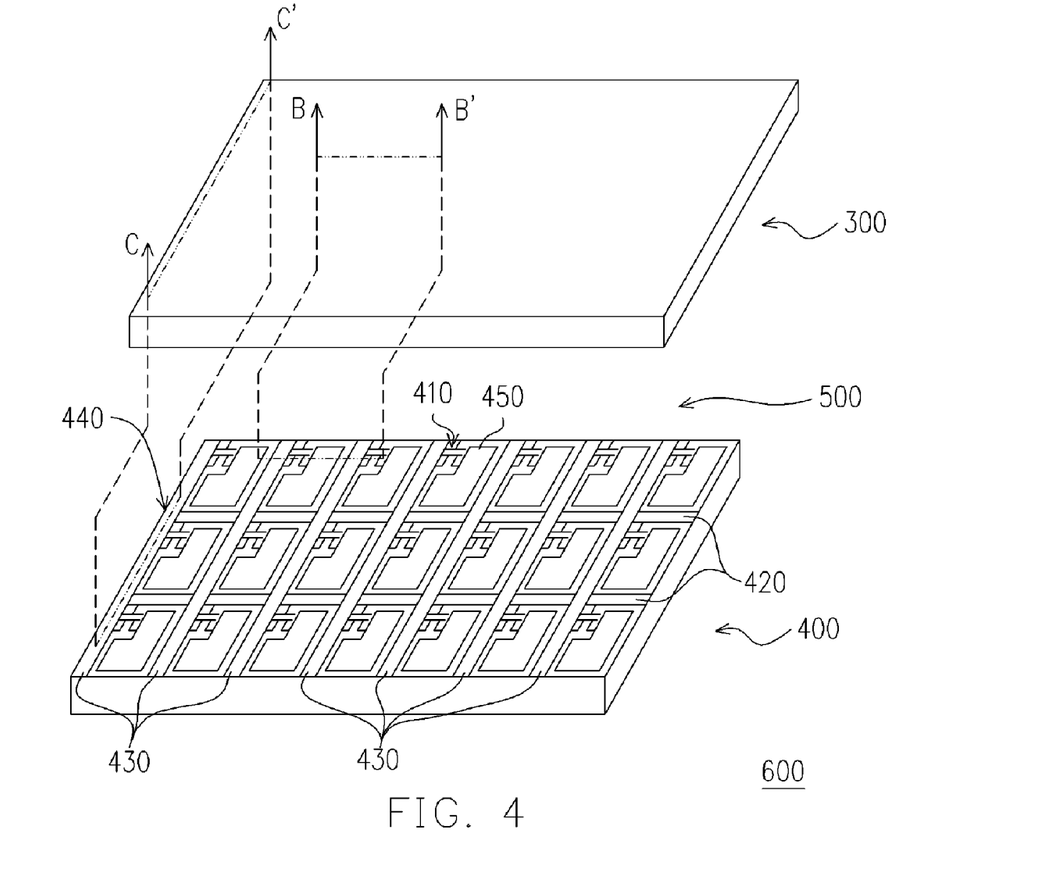
FIG. 4 is a three-dimensional view showing a liquid crystal display panel according to a preferred embodiment of the present invention.
Figure 4A:
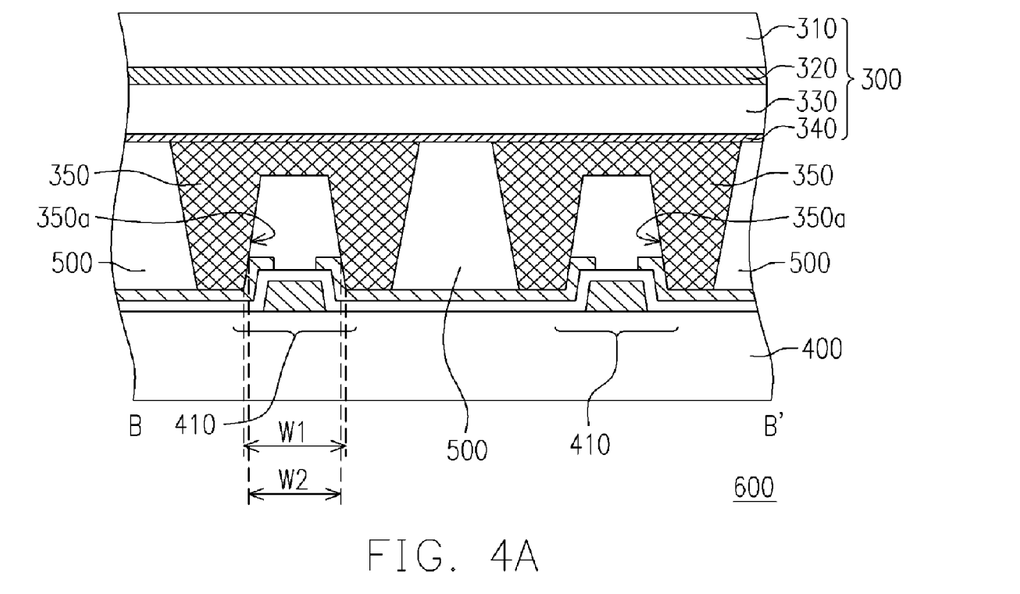
FIG. 4A is a schematic cross-sectional view along line B-B' of FIG. 4.
Figure 4B:
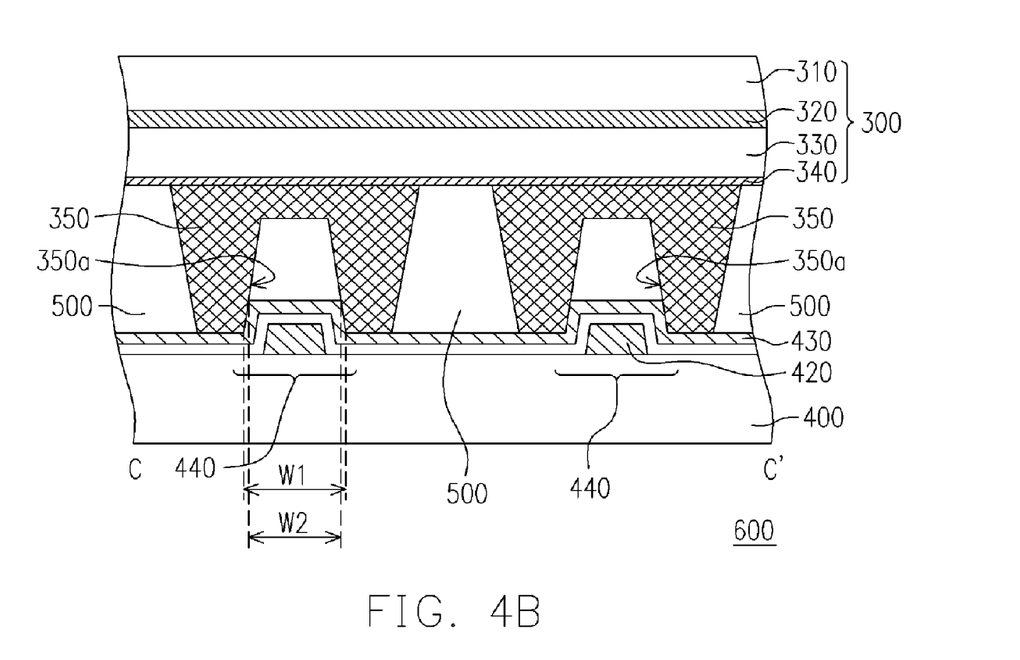
FIG. 4B is a schematic cross-sectional view along line C-C' of FIG. 4.

FIG. 4 is a three-dimensional view showing a liquid crystal display panel according to a preferred embodiment of the present invention. FIG. 4A is a schematic cross-sectional view along line B-B' of FIG. 4. FIG. 4B is a schematic cross-sectional view along line C-C' of FIG. 4. Please refer to FIGS. 4, 4A and 4B, the liquid crystal display panel 600 comprises a color filter substrate 300, an active device array substrate 400 and a liquid crystal layer 500. The color filter substrate 300 is the above-mentioned color filter substrate, and so it is not repeated herein. The active device array substrate 400 comprises a plurality of active devices 410, a plurality of scan lines 420 and a plurality of data lines 430, and a plurality of protrusions 440 formed at the regions where the scan lines 420 overlap with the data line 430. Besides, the pixel electrodes 450 are electrically connected to the active devices 440. The liquid crystal layer 500 is disposed between the color filter substrate 300 and the active device array substrate 400. When the color filter substrate 300 is assembled with the active device array substrate 400, at least one of the active devices 410 and the protrusions 440 is wedged in the corresponding clipping opening 350a (as shown in FIGS. 4A and 4B).

In one embodiment of the present invention, the spacers 350 can be photo-spacers. Besides, the spacers 350 can be made of photoresist, and the height of each spacer 350 is between 0.2~5.0 μm. Besides, the width w1 of the upper part of the clipping opening 350a is wider than the width w2 of the active devices 410 and the protrusions 440 for about 2~3 μm. Compared to the conventional contact openings 126a, the dimension of the clipping opening 350a of the spacer 350 is larger, and therefore the assembly precision of the color filter substrate 300 and the active device array substrate 400 can be enhanced.

In accordance with the foregoing descriptions, the active device 410 shown in FIG. 4A can be wedged in the clipping opening 350a; the active device 410 can be a thin film transistor, and the height of the active device 410 is between 0.3~0.6 μm. Besides, the protrusions 440 formed at the regions where the scan lines 420 overlap with the data line 430 can also be wedged in the clipping opening 350a, and the height of the protrusion 440 is between 0.3~0.6 μm.

Figure 5A:
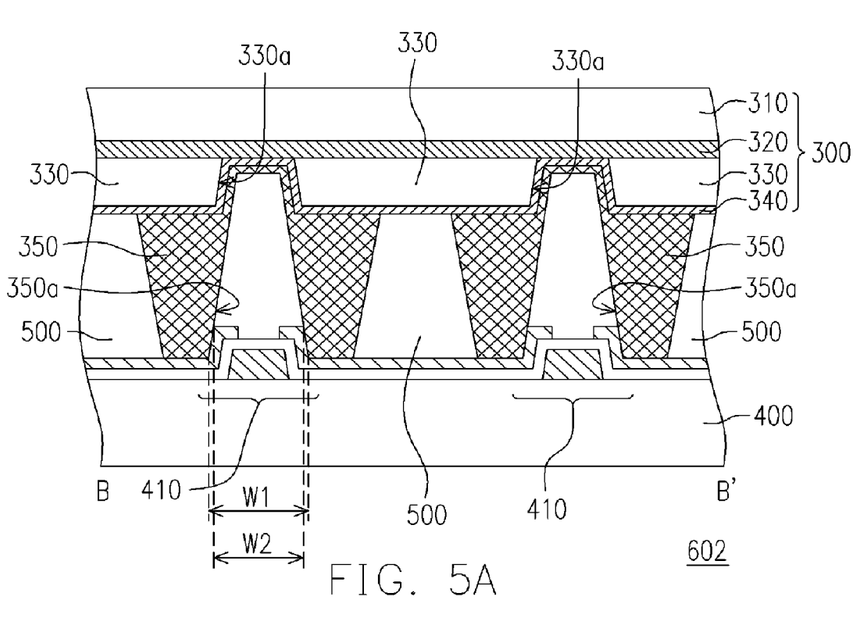
FIGS. 5A and 5B are schematic cross-sectional view showing other liquid crystal display panel according to the preferred embodiments of the present invention.
Figure 5B:
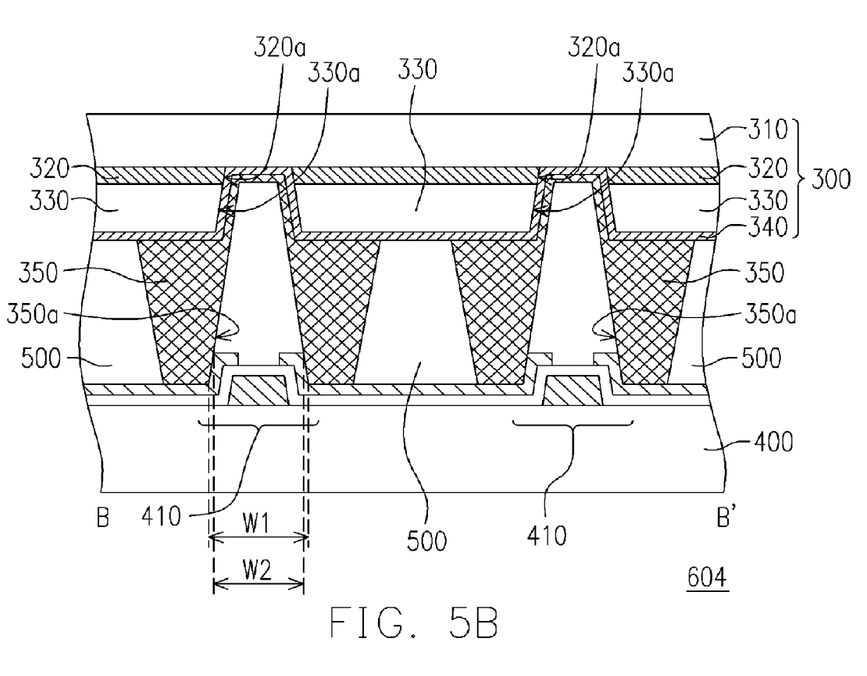

Similarly, the liquid crystal display panels 602, 604 shown in FIGS. 5A and 5B can be formed by assembling the color filter substrates 302, 304 shown in FIGS. 3B and 3C and the active device array substrate 400 together, to make the liquid crystal display panel 600 bear larger lateral stress. The cross-sectional view showing the active device 410 wedged in the clipping opening 350a of the spacer 350 is illustrated herein. However, the assembly of the protrusions 440 formed at the regions where the scan lines 420 overlap with the data line 430 wedged in the clipping opening 350a of the spacer 350 is similar to that shown in FIGS. 5A and 5B, so it is not repeated herein.

In summary, the color filter substrate and the liquid crystal display panel have the following advantages:

1. The spacers of the present invention have the clipping openings, such that the active devices protruded in the surface of the active device array substrate and/or the protrusions formed at the regions where the scan lines overlap with the data lines can be wedged in the clipping openings. Therefore, the assembly precision of the color filter substrate and the active device array substrate can be improved.

2. A part of the spacers can be formed in the first grooves of the color-filter substrate and/or the second grooves of the light shielding layer by photolithography process. Accordingly, the spacers can bear larger lateral stress, and further the problem of displacement between two substrates or light leakage can be prevented. Besides, the spacers would not be separated from the substrate easily.

3. The spacers having clipping openings can be formed by photolithography process, therefore, there is no need to increase the number of masks and the cost would not be increased, too.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color filter substrate suitable for being assembled with an active device array substrate, the active device array substrate comprising a plurality of active devices, a plurality of scan lines and a plurality of data lines, a plurality of protrusions formed at the regions where the scan lines overlap with the data lines, the color filter substrate comprising:

a substrate;

a light shielding layer disposed on the substrate to define a plurality of sub-pixel regions;

a color filter layer disposed within the sub-pixel regions on the substrate and covering the light shielding layer;

a conductive layer disposed on the substrate and covering the color filter layer and the light shielding layer; and a plurality of spacers disposed on the substrate, and each spacer having a clipping opening therein, and at least one of the active devices being wedged in the corresponding clipping opening.

2. The color filter substrate according to claim 1, wherein the light shielding layer is a black matrix.

3. The color filter substrate according to claim 1, wherein the spacer is a photo-spacer.

4. The color filter substrate according to claim 1, further comprising a first groove disposed in the color filter layer and corresponding to each spacer, and each spacer being partially disposed within the first groove.

5. The color filter substrate according to claim 4, further comprising a second groove disposed in the light shielding layer and corresponding to each spacer, and each spacer being partially disposed within the first groove and the second groove.

6. The color filter substrate according to claim 1, wherein the width of the upper part of the clipping opening is wider than that of the active devices and the protrusions for about 2~3 µm.

7. The color filter substrate according to claim 1, wherein the height of each spacer is between 0.2~5.0 µm.

8. The color filter substrate according to claim 1, wherein the material of the spacers comprises photoresist.

9. The color filter substrate according to claim 1, wherein the active devices comprise thin film transistors.

10. The color filter substrate according to claim 1, wherein the material of the conductive layer comprises one of indium tin oxide and indium zinc oxide.

11. A liquid crystal display panel, comprising:
a color filter substrate as recited in claim 1;
an active device array substrate comprising a plurality of active devices, a plurality of scan lines and a plurality of data lines, and a plurality of protrusions formed at the regions where the scan lines overlap with the data line; and
a liquid crystal layer disposed between the color filter substrate and the active device array substrate;
wherein at least one of the active devices is wedged in the corresponding clipping opening.

12. The liquid crystal display panel according to claim 11, wherein the light shielding layer is a black matrix.

13. The liquid crystal display panel according to claim 11, wherein the spacer is a photo-spacer.

14. The liquid crystal display panel according to claim 11, further comprising a first groove disposed in the color filter layer and corresponding to each spacer, and each spacer being partially disposed within the first groove.

15. The liquid crystal display panel according to claim 14, further comprising a second groove disposed in the light shielding layer and corresponding to each spacer, and each spacer being partially disposed within the first groove and the second groove.

16. The liquid crystal display panel according to claim 11, wherein the width of the upper part of the clipping opening is wider than that of the active devices and the protrusions for about 2~3 µm.

17. The liquid crystal display panel according to claim 11, wherein the height of each spacer is between 0.2~5.0 µm.

18. The liquid crystal display panel according to claim 11, wherein the height of the active device is between 0.3~0.6 µm.

19. The liquid crystal display panel according to claim 11, wherein the height of the protrusion is between 0.3~0.6 µm.

20. The liquid crystal display panel according to claim 11, wherein the active devices comprise thin film transistors.

21. The liquid crystal display panel according to claim 11, wherein the material of the conductive layer comprises indium tin oxide or indium zinc oxide.

22. The color filter substrate according to claim 1, wherein the clipping opening has a bottom portion near the substrate and a top portion far away the substrate, and the top portion is wider than the bottom portion.

23. The color filter substrate according to claim 22, wherein an air gap is existed between the bottom portion of the clipping opening and the active device.

24. The liquid crystal display panel according to claim 11, wherein the clipping opening has a bottom portion near the substrate and a top portion far away the substrate, and the top portion is wider than the bottom portion.

25. The liquid crystal display panel according to claim 24, wherein an air gap is existed between the bottom portion of the clipping opening and the active device.

* * * * *